(12) United States Patent
Brown

(10) Patent No.: US 12,326,296 B2
(45) Date of Patent: Jun. 10, 2025

(54) TEMPERATURE REGULATING APPARATUS AND METHODS OF USING SAME

(71) Applicant: FUSE, LLC, Memphis, TN (US)

(72) Inventor: Matthew S. Brown, Falkner, MS (US)

(73) Assignee: FUSE, LLC, Memphis, TN (US)

( * ) Notice: Subject to any disclaimer, the term of this patent is extended or adjusted under 35 U.S.C. 154(b) by 361 days.

(21) Appl. No.: 18/010,547

(22) PCT Filed: Jun. 21, 2021

(86) PCT No.: PCT/US2021/038176
§ 371 (c)(1),
(2) Date: Dec. 15, 2022

(87) PCT Pub. No.: WO2021/258036
PCT Pub. Date: Dec. 23, 2021

(65) Prior Publication Data
US 2023/0235939 A1    Jul. 27, 2023

Related U.S. Application Data

(60) Provisional application No. 63/041,259, filed on Jun. 19, 2020.

(51) Int. Cl.
*F25D 3/00* (2006.01)
*F25B 41/34* (2021.01)

(52) U.S. Cl.
CPC ............... *F25D 3/00* (2013.01); *F25B 41/34* (2021.01); *F25D 2400/361* (2013.01)

(58) Field of Classification Search
CPC .... F25D 3/00; F25D 3/12; F25B 41/34; F24F 5/0003
(Continued)

(56) References Cited

U.S. PATENT DOCUMENTS

| | | |
|---|---|---|
| 3,500,014 A | 3/1970 | Longo |
| 3,949,258 A | 4/1976 | Soodak |

(Continued)

FOREIGN PATENT DOCUMENTS

| | | |
|---|---|---|
| CH | 670150 | 5/1989 |
| FR | 285103 | 1/2006 |

(Continued)

OTHER PUBLICATIONS patents.google.com, English translation of RU78632U1, accessed Dec. 13, 2021.

(Continued)

*Primary Examiner* — Steve S Tanenbaum
(74) *Attorney, Agent, or Firm* — ASHLEY LAW FIRM P.C.; Stephen S. Ashley, Jr.

(57) ABSTRACT

A temperature regulating apparatus can comprise a housing, an intake fan, an outlet fan, and one or more canisters containing a pressurized cooling gas, such as carbon dioxide, freon, nitrogen, difluoroethane, trifluoroethane, or tetrafluoroethane, positioned within the housing. The inlet fan draws warm air from outside of the housing into the housing through vent openings formed in the housing. Cooling gas is released from the canisters when a temperature sensing device detects the ambient temperature is above a predetermined desired temperature, and the outlet fan blows cooled air out of the housing through the vent openings, whereby the ambient temperature outside of the housing can be cooled to the predetermined desired temperature.

20 Claims, 11 Drawing Sheets

(58) Field of Classification Search
USPC .................................................. 62/457.9
See application file for complete search history.

(56) References Cited

U.S. PATENT DOCUMENTS

| | | | |
|---|---|---|---|
| 4,754,376 A | 6/1988 | Winslow | |
| 4,984,760 A | 1/1991 | Cohn et al. | |
| 5,067,771 A | 11/1991 | Ellis | |
| 5,178,450 A | 1/1993 | Zelensky | |
| 5,337,579 A * | 8/1994 | Saia, III | F25D 29/001 62/239 |
| 5,363,670 A * | 11/1994 | Bartilucci | F25D 29/001 62/166 |
| 5,613,756 A | 3/1997 | Allen | |
| 5,750,962 A | 5/1998 | Hyatt | |
| 5,768,898 A | 6/1998 | Seok et al. | |
| 6,182,462 B1 | 2/2001 | Bania et al. | |
| 6,283,612 B1 | 9/2001 | Hunter | |
| 6,997,007 B1 | 2/2006 | Wyatt | |
| 7,162,890 B2 | 1/2007 | Mogil et al. | |
| 8,096,442 B2 | 1/2012 | Ramundi | |
| 8,210,702 B1 | 7/2012 | Sandberg | |
| 8,511,846 B1 | 8/2013 | Sandberg | |
| 8,590,726 B1 | 11/2013 | Mickelson et al. | |
| 8,844,316 B1 | 9/2014 | Ademola et al. | |
| 9,027,806 B1 | 5/2015 | Giogga | |
| 9,255,673 B2 | 2/2016 | Horn | |
| 9,303,912 B1 | 4/2016 | Schalla et al. | |
| 9,546,677 B2 | 1/2017 | Wicks | |
| 9,568,186 B2 | 2/2017 | Brown | |
| 9,671,158 B1 | 6/2017 | Sandberg et al. | |
| 9,706,831 B2 | 7/2017 | Wu | |
| 9,726,424 B1 | 8/2017 | Sandberg | |
| 9,890,993 B1 | 2/2018 | Sandberg | |
| 9,975,675 B1 | 5/2018 | Kuo | |
| 10,001,321 B2 | 6/2018 | Statham | |
| 10,082,329 B1 | 9/2018 | Sandberg et al. | |
| 10,088,144 B1 | 10/2018 | Sandberg | |
| 10,337,701 B2 | 7/2019 | Mastenbroek et al. | |
| 10,514,164 B2 | 12/2019 | Brown | |
| 10,874,233 B2 | 12/2020 | Santiago | |
| 10,996,488 B2 | 5/2021 | Brown | |
| 11,035,567 B2 | 6/2021 | Brown | |
| 11,383,903 B1 | 7/2022 | Gayle | |
| 11,666,179 B2 | 6/2023 | Mogil et al. | |
| 2005/0047118 A1 | 3/2005 | Spahr et al. | |
| 2005/0213326 A1 | 9/2005 | Sanford | |
| 2006/0196218 A1 | 7/2006 | Mogil | |
| 2007/0103895 A1 | 5/2007 | Riesebosch | |
| 2007/0206372 A1 | 9/2007 | Casillas | |
| 2009/0175029 A1 | 7/2009 | Chiang | |
| 2014/0043837 A1 | 2/2014 | Michaud | |
| 2014/0204565 A1 | 7/2014 | Zwierstra | |
| 2015/0069096 A1 | 3/2015 | Kampas | |
| 2018/0020814 A1 | 1/2018 | Pasinski | |
| 2020/0003487 A1 | 1/2020 | Brown | |
| 2020/0100513 A1 | 4/2020 | Young | |
| 2022/0214035 A1 | 7/2022 | Brown | |
| 2022/0282911 A1 | 9/2022 | Brown | |
| 2022/0364712 A1 | 11/2022 | Brown | |
| 2023/0055756 A1 | 2/2023 | Brown | |
| 2023/0200575 A1 | 6/2023 | Brown | |

FOREIGN PATENT DOCUMENTS

| | | |
|---|---|---|
| KR | 20120120662 A | 11/2012 |
| RU | 2026084 C1 | 1/1995 |
| RU | 42623 U1 | 12/2004 |
| RU | 44508 U1 | 3/2005 |
| RU | 54138 U1 | 6/2006 |
| RU | 73595 U1 | 5/2008 |
| RU | 78632 U1 | 12/2008 |
| RU | 81557 U1 | 3/2009 |
| RU | 117575 U1 | 6/2012 |
| RU | 2505735 C1 | 1/2014 |
| RU | 2714623 C2 | 2/2020 |
| SU | 810091 A3 | 2/1981 |
| WO | WO2015176960 A1 | 11/2015 |

OTHER PUBLICATIONS patents.google.com, English translation of RU54138U1, accessed Dec. 13, 2021.
patents.google.com, English translation of RU2505735C1, accessed Dec. 3, 2021.
patents.google.com, English translation of RU2026084C1, accessed Dec. 3, 2021.
patents.google.com, English translation of RU81557U1, accessed Dec. 3, 2021.
patents.google.com, English translation of RU117575U1, accessed Dec. 3, 2021.
patents.google.com, English translation of RU44508U1, accessed Dec. 3, 2021.
patents.google.com, English translation of RU42623U1, accessed Dec. 3, 2021.
patents.google.com, English translation of RU73595U1, accessed Dec. 3, 2021.
patents.google.com, English translation of RU2714623C2, accessed Dec. 13, 2021.
patents.google.com, English translation of SU810091A3, accessed Dec. 13, 2021.
patents.google.com, English translation of FR2851034, accessed Aug. 31, 2023.
patents.google.com, English translation of CH670150, accessed Aug. 31, 2023.
European Patent Office, English translation of KR20120120662A, Sep. 9, 2024.
Fish & Richardson P.C., "Claim Charts—U.S. Appl. No. 18/129,608", filed Sep. 15, 2024.
Fish & Richardson P.C., "Claim Charts—U.S. Appl. No. 18/430,002", filed Sep. 15, 2024.
International Search Report for International Application No. PCT/US2021/038176; mailed Sep. 30, 2021.

* cited by examiner

TEMPERATURE REGULATING APPARATUS AND METHODS OF USING SAME

CROSS REFERENCE TO RELATED APPLICATIONS

This application is a national stage application of International Application No. PCT/US2021/038176, which claims priority to U.S. Provisional Patent Application No. 63/041,259, filed Jun. 19, 2020, which is incorporated herein by reference. In addition, U.S. Pat. No. 10,514,164 and U.S. Patent Application Publication No. 2020/0003487 are incorporated herein by reference.

TECHNICAL FIELD

The present invention relates to cooling devices. One embodiment of the invention comprises a portable cooling device that can be placed in a variety of containers. Another embodiment of the invention comprises a container apparatus comprising a container body and a removable cooling device that is positioned in a recess formed in the container body.

SUMMARY

One object of the present invention is to provide a cooling device that is easily transportable. Another object of the invention is to provide a cooling device that can be used in a container, such as a thermally insulated cooler. These and other objects of the invention can be achieved in one or more embodiments of the invention described herein.

An embodiment of the invention comprises a portable cooling apparatus.

Another embodiment of the invention comprises a temperature regulating apparatus adapted for use in a container.

According to an embodiment of the invention, the temperature regulating apparatus is adapted to lower the ambient temperature of the interior of the container.

According to an embodiment of the invention, the temperature regulating apparatus comprises a housing and a gas contained in the housing that can alter the ambient temperature, such as carbon dioxide. The temperature regulating apparatus dispenses the gas through at least one opening formed in the housing. The temperature regulating apparatus can be positioned in a container, such as a thermally insulated cooler. The temperature regulating apparatus is not operatively connected to the cooler and is easily removable from the cooler.

According to an embodiment of the invention, the temperature regulating apparatus does not alter the form, fit or function of the container in which it is positioned.

According to an embodiment of the invention, the enclosure can be a thermally insulated cooler. The temperature regulating apparatus is not operatively connected to the cooler and is removable from cooler.

Another embodiment of the invention comprises a container apparatus comprising a container body and a temperature regulating apparatus removably positioned within a recess formed in the interior surface of the container body.

According to an embodiment of the invention, the temperature regulating apparatus can be removed from the recess in the container body without removing any other component of the container apparatus.

According to an embodiment of the invention, the container body comprises a base, a sidewall extending upwardly from the base, and a lid pivotally connected to the sidewall.

According to an embodiment of the invention, the temperature regulating apparatus is removably positioned within a recess formed in an interior surface of the sidewall.

According to an embodiment of the invention, the temperature regulating apparatus is removably positioned within a recess formed in an interior surface of the base.

According to another embodiment of the invention, the temperature regulating apparatus is removably positioned within the lid of the container body.

Another embodiment of the invention comprises a container apparatus comprising a container body and a temperature regulating insert assembly received and releasably maintained within a substantially concave recess formed in the interior surface of the container body.

According to an embodiment of the invention, the container can be a thermally insulated cooler, and the temperature regulating apparatus comprises a dispensing mechanism that dispenses a cooling gas into the interior of the cooler.

According to an embodiment of the invention, the cooling gas can comprise carbon dioxide, freon, nitrogen, difluoroethane, trifluoroethane, and/or tetrafluoroethane.

Another embodiment of the invention comprises a temperature regulated container apparatus comprising a temperature regulating apparatus comprising a housing and a gas contained in the housing that can alter the ambient temperature. The temperature regulating apparatus is adapted to dispense the gas through at least one opening formed in the housing. The container apparatus further comprises an enclosure comprising a base, and at least one sidewall extending upwardly from the base, which defines an interior area within the enclosure. The enclosure has an interior surface and at least one substantially concave recess formed in the interior surface adapted to receive the temperature regulating apparatus therein, wherein the ambient temperature in the interior area of the enclosure is altered when the temperature regulating apparatus dispenses the gas.

Another embodiment of the invention comprises a container apparatus comprising an enclosure and at least one temperature regulating apparatus removably positioned within the enclosure. The enclosure defines an interior area for storing items therein, and the enclosure has an interior surface facing the interior area and at least one substantially concave recess formed in the interior surface to form a recessed portion of the interior surface. Each substantially concave recess is sized and shaped to receive a temperature regulating apparatus therein, and when so positioned each temperature regulating apparatus is substantially flush with the non-recessed portion of the interior surface.

Another embodiment of the invention comprises a temperature regulating apparatus comprising a housing comprising at least one wall having a first vent and a second vent formed therein. An intake fan is positioned within the housing proximate the first vent, and the intake fan is adapted to draw air from outside of the housing into the housing through the first vent. An outlet fan is positioned within the housing proximate the second vent. The outlet fan blows air out of the housing through the second vent to exit the housing. At least one container is positioned within the housing that contains pressurized gas capable of altering an ambient temperature. Pressurized gas released from the container is blown by the outlet fan through the second vent out of the housing whereby the ambient temperature outside of the housing is altered.

According to an embodiment of the invention, the pressurized gas is carbon dioxide, freon, nitrogen, difluoroethane, trifluoroethane, or tetrafluoroethane, and the pressurized gas lowers ambient temperature.

According to an embodiment of the invention, a thermal reed switch can be connected to the container that is adapted for controlling the flow of pressurized gas from the container. The thermal reed switch is moveable between an open position wherein pressurized gas is allowed to exit the container and a closed position wherein pressurized gas does not exit the container.

According to another embodiment of the invention, a temperature sensing device, such as a thermal probe, can be positioned within the housing, and a computing device can be operatively connected to the temperature sensing device and the thermal reed switch. The computing device is adapted to send a signal to the thermal reed switch causing the thermal reed switch to move to the open position thereby allowing pressurized gas to escape from the container when the temperature sensing device detects an ambient temperature above a predetermined temperature.

According to another embodiment of the invention, the computing device comprises a non-transitory computer readable storage medium comprising software having programming instructions that, when executed, causes the computing device to electronically transmit the signal to the thermal reed switch causing the thermal reed switch to move to the open position allowing pressurized gas to flow from the container when the temperature sensing device detects an ambient temperature above the predetermined temperature.

According to another embodiment of the invention, the computing device comprises a timer, and the computing device sends a signal to the thermal reed switch causing the thermal reed switch to move to the open position allowing pressurized gas to flow from the container at timed intervals to maintain ambient temperature at the predetermined temperature.

According to another embodiment of the invention, the temperature regulating apparatus comprises a motherboard comprising a touch screen display operatively connected to a computing device. A user can enter a predetermined desired temperature via the touch screen display.

According to another embodiment of the invention, the computing device comprises a microcontroller operatively connected via wireless communication technology to a second computing device located outside of the housing, such as a mobile smart phone. A user can enter a predetermined desired temperature via the second computing device.

According to another embodiment of the invention, the temperature regulating apparatus includes a power source positioned within the housing and operatively connected to the motherboard and the intake and outlet fans to power the motherboard and the fans. The power source can comprise a 5000 mAh battery bank that can be recharged via a USB charge port.

According to another embodiment of the invention, the temperature regulating apparatus can include a tube having a first end in communication with the pressurized gas container and a second end opposed to the first end, wherein pressurized gas released from the container travels through the tube and exits the second end of the tube into an interior area of the housing and is blown by the outlet fan through the second vent out of the housing.

According to another embodiment of the invention, the pressurized gas container comprises a plurality of canisters in communication with the tube.

According to another embodiment of the invention, a thermal reed switch can be operatively connected to the tube and adapted for controlling the exit of pressurized gas from the tube. The thermal reed switch is moveable between an open position wherein pressurized gas is allowed to exit the second end of the tube and a closed position wherein pressurized gas does not exit the tube.

According to another embodiment of the invention, a temperature sensing device can be positioned within the housing and a computing device can be operatively connected to the temperature sensing device and the thermal reed switch. The computing device sends a signal to the thermal reed switch causing the thermal reed switch to move to the open position thereby allowing pressurized gas to exit the second end of the tube when the temperature sensing device detects an ambient temperature above a predetermined temperature.

According to another embodiment of the invention, the computing device comprises a timer, and the computing device sends a signal to the thermal reed switch causing the thermal reed switch to move to the open position allowing pressurized gas to flow from the second end of the tube at timed intervals to maintain the ambient temperature at the predetermined temperature.

Another embodiment of the invention comprises a container apparatus comprising an enclosure defining an interior area for storing items therein and a temperature regulating device. The enclosure has an interior surface facing the interior area and a recess formed in the interior surface to form a recessed portion of the interior surface. The temperature regulating device can comprise a housing comprising at least one wall having a first vent and a second vent formed therein. The housing is positioned within the recessed portion of the interior surface of the enclosure with the first vent and the second vent facing the interior area of the enclosure. An intake fan is positioned within the housing proximate the first vent, the intake fan draws in air from outside of the housing through the first vent. An outlet fan is positioned within the housing proximate the second vent. The outlet fan blows air out of the housing through the second vent into the interior area of the enclosure. A container is positioned within the housing that contains pressurized gas capable of altering an ambient temperature. Pressurized gas released from the at least one container is blown by the outlet fan through the second vent out of the housing and into the interior area of the enclosure whereby the ambient temperature of the interior area of the enclosure is altered.

According to another embodiment of the invention, the recess is sized and shaped to receive the housing of the temperature regulating device therein and the housing is substantially flush with the non-recessed portion of the interior surface when it is positioned in the recess.

According to another embodiment of the invention, the enclosure comprises a thermally insulated cooler, and the temperature regulating device is not electrically connected to the enclosure.

According to another embodiment of the invention, a thermal reed switch is operatively connected to the pressurized gas container and controls the flow of pressurized gas from the container. The thermal reed switch is moveable between an open position wherein pressurized gas is allowed to exit the container and a closed position wherein pressurized gas cannot exit the container. A temperature sensing device, such as a thermal probe, can be positioned within the housing and a computing device can be operatively connected to the temperature sensing device and the thermal reed switch. The computing device sends a signal to the thermal reed switch causing the thermal reed switch to move to the open position allowing pressurized gas to flow from the at least one container when the temperature sensing device detects an ambient temperature above a predetermined temperature.

Another embodiment of the invention comprises a kit comprising a container, such as a thermally insulated cooler, and a temperature regulating apparatus releasably retained within container. The temperature regulating apparatus is not electrically connected to the container and can be easily removed from the container.

DETAILED DESCRIPTION OF PREFERRED EMBODIMENTS

Figure 1:
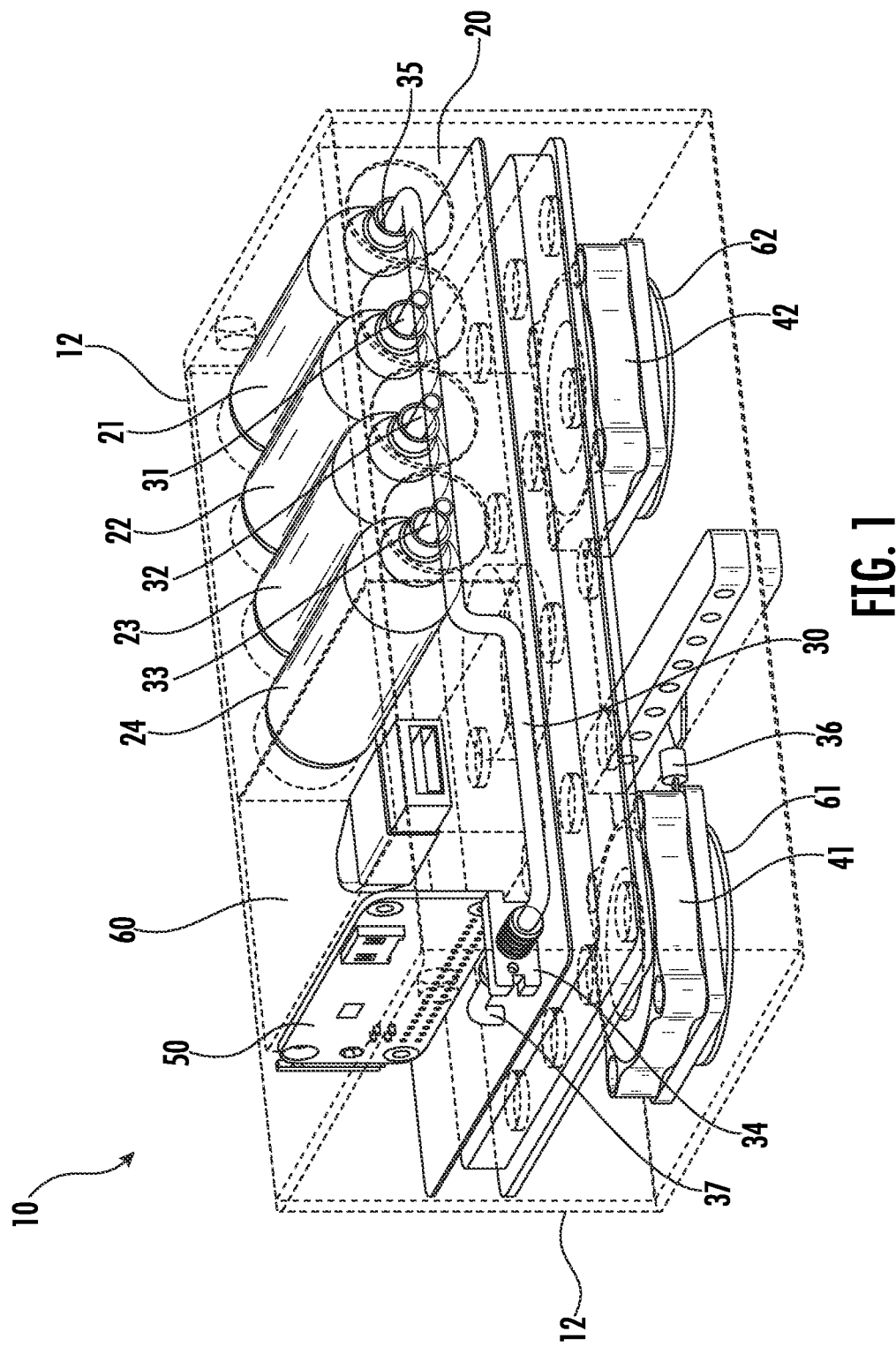
FIG. 1 is perspective view of a temperature regulating apparatus according to an embodiment of the invention.

A temperature regulating apparatus according to a preferred embodiment of the invention is illustrated in FIGS. 1-8, and shown generally at reference numeral 10. The temperature regulating apparatus 10 comprises a housing 12 containing a plurality of canisters 21, 22, 23, 24 containing pressurized gas that can alter the ambient temperature when dispensed. In a preferred embodiment, the gas has a temperature of −25 degrees Fahrenheit. Preferably, each canister 21, 22, 23, 24 contains a cooling gas, such as carbon dioxide ($CO_2$). Alternatively, the cooling gas can be freon, nitrogen, a fluorocarbon, such as difluoroethane, trifluoroethane or tetrafluoroethane, or other suitable gas.

In a preferred embodiment, the housing 12 has the shape of a rectangular cuboid and has dimensions of six inches by four inches by two inches. In another preferred embodiment, the housing 12 has dimension of 3.5 inches by 2.5 inches by 1.5 inches.

Figure 5:
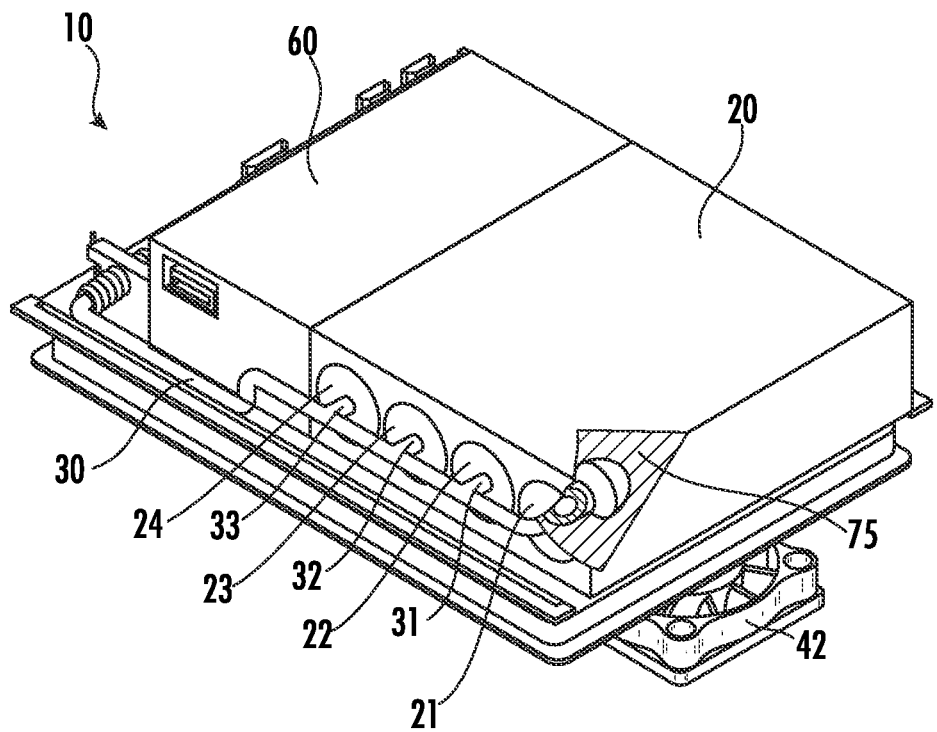
FIG. 5 is a perspective view of the apparatus of FIG. 1.
Figure 6:
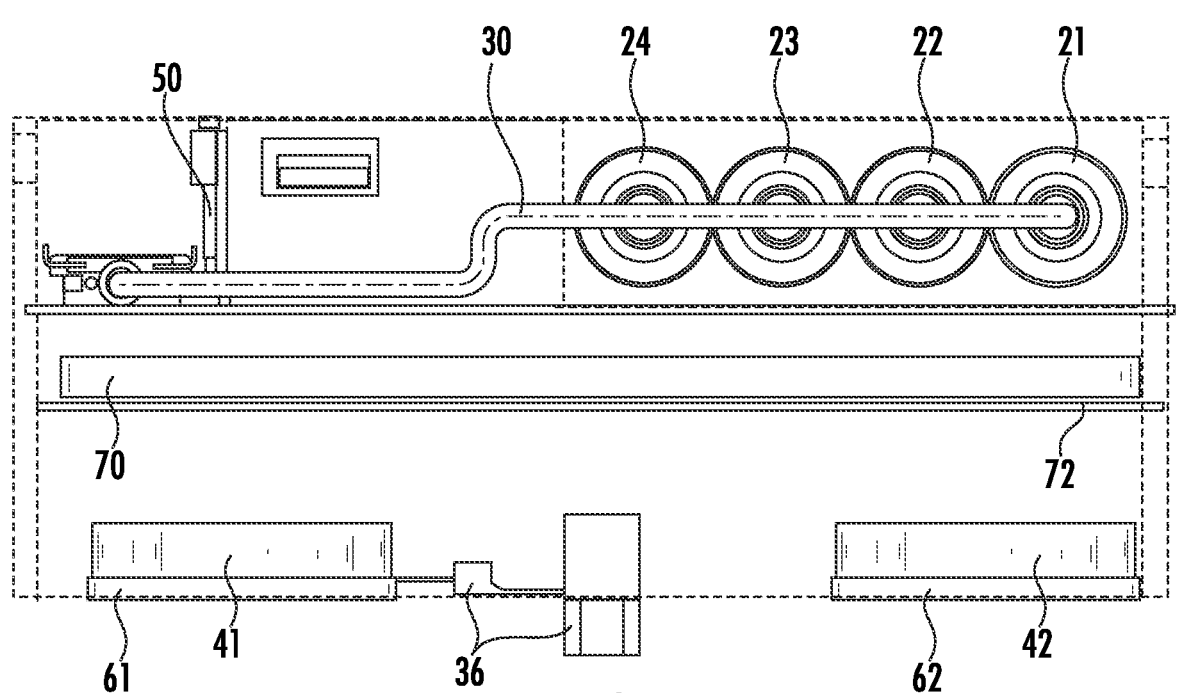
FIG. 6 is another schematic view of the apparatus of FIG. 1.

The carbon dioxide canisters 21, 22, 23, 24 are positioned within a canister compartment 20. One canister 21 communicates with a terminal end of a tube 30, and the other canisters 22, 23, 24 are connected to the tube 30 via tee valves 31, 32, 33, as shown in FIGS. 5 and 6. Carbon dioxide gas from the canisters 21, 22, 23, 24 travels into the tube 30.

Figure 4:
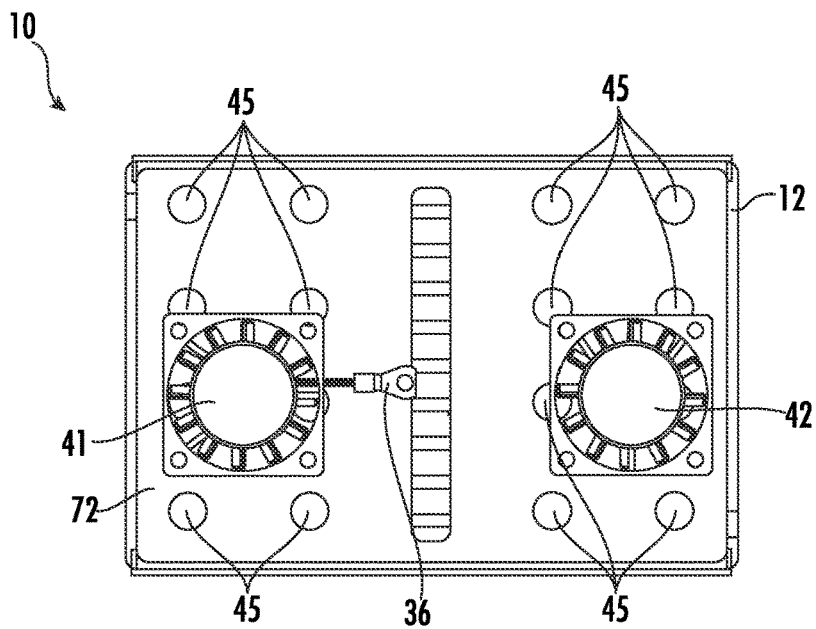
FIG. 4 is another schematic view of the apparatus of FIG. 1.

The apparatus 10 includes a pair of fans 41, 42, as shown in FIGS. 1 and 4. One fan 41 is adapted to draw air into the apparatus 10 from outside of the apparatus 10, and the other fan 42 is adapted to blow the air out of the apparatus 10. The intake fan 41 is positioned proximate an intake vent 61 formed in the housing 12. The outlet fan 42 is positioned proximate an outlet vent 62 formed in the housing 12. Air outside of the housing 12 is drawn in by the intake fan 41 through the intake vent 61, and air inside of the housing 12 is expelled through the outlet vent 62 by the outlet fan 42. The walls of the housing 12 can be made of aluminum, or other suitable material. One end 35 of the tube 30 has an opening that communicates with the first carbon dioxide canister 21 and the opposite end of the tube 30 has an opening 37 for the carbon dioxide gas to exit into an area proximate the fans 41, 42.

As shown in FIG. 1, the tube 30 is operatively connected to a thermal reed switch 34 that can stop the flow of gas through the tube 30. A temperature sensing device such as a thermal probe 36 is positioned proximate the intake fan 41, as shown in FIG. 4. The thermal reed switch 34 and the thermal probe 36 are operatively connected to a motherboard 50, shown in FIGS. 1 and 2.

The motherboard 50 comprises a computing device, such as a microcontroller. In addition, the motherboard 50 can include a thermostat and a timer. A user can enter a desired temperature into the motherboard 50. The motherboard 50 can be programmed with a non-transitory computer readable storage medium comprising software having programming instructions that, when executed, causes the microcontroller to electronically transmit signals to the thermal reed switch 34 causing the reed switch 34 to open to allow the flow of carbon dioxide gas through the exit 37 of the tube 30 when the thermal probe 36 detects a temperature above the desired temperature that has been programmed into the motherboard 50. The motherboard 50 can be programmed to open the thermal reed switch 34 at timed intervals in order to achieve and maintain the desired temperature that has been entered by the user. When the thermal reed switch 34 opens, carbon dioxide ($CO_2$) gas is allowed to escape from the tube 30 and is blown out of the housing 12 by the outlet fan 42. When the thermal probe 36 detects that the desired ambient temperature is achieved, the motherboard 50 sends a signal to the thermal reed switch 34 to close thereby stopping the flow of carbon dioxide gas out of the tube 30.

In a preferred embodiment, the motherboard 50 includes wireless technology, such as the wireless communication technology sold under the mark "BLUETOOTH", which is operatively connected to the microcontroller. Software can be integrated into a mobile application that can be downloaded onto a mobile smartphone, whereby a user can enter a desired temperature and perform other programming of the apparatus 10 via a mobile device, such as a smartphone. The user can download the application at the APP STORE.

The apparatus 10 includes a power source for powering the fans 41, 42 and the motherboard 50. The power source can comprise a 5000 mAh battery bank 60 positioned adjacent the canister compartment 20, as shown in FIGS. 1 and 5. The battery can be operatively connected to the motherboard 50 and fans 41, 42. The battery can be rechargeable and operatively connected to a charge port, such as USB port 52, whereby the battery can be recharged by plugging a power adaptor into the charge port 52.

Figure 2:
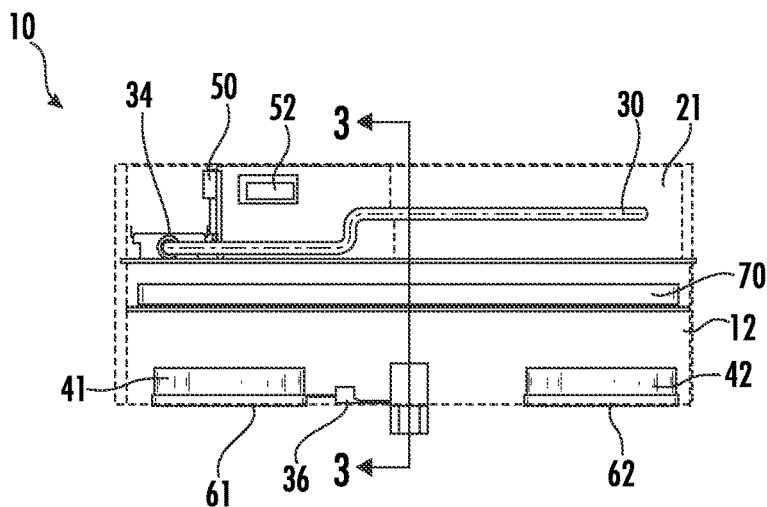
FIG. 2 is schematic view of the apparatus of FIG. 1.
Figure 3:
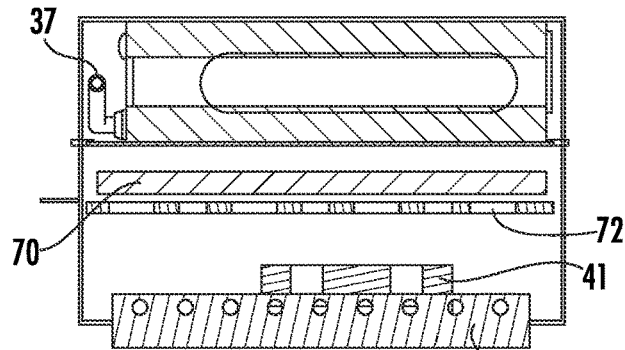
FIG. 3 is a cross sectional view of the apparatus of FIG. 1, taken along lines 3-3 of FIG. 2.
Figure 7:
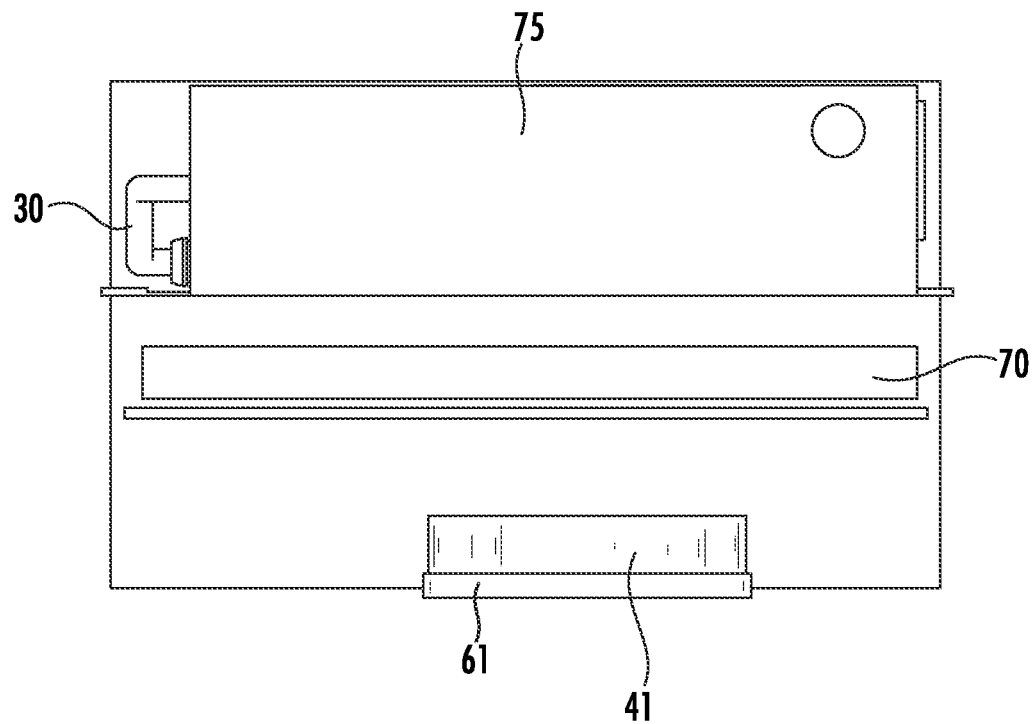
FIG. 7 is a partial schematic view of the apparatus of FIG. 1.
Figure 8:
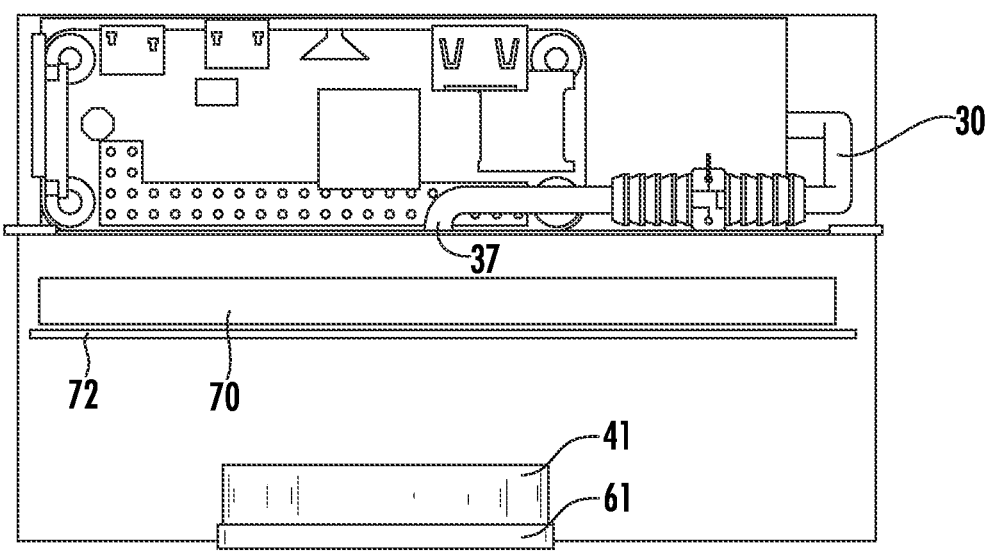
FIG. 8 is another schematic view of the apparatus of FIG. 1.

In a preferred embodiment, the apparatus 10 includes a cooling sleeve member 70 positioned intermediate the tube exit 37 and the fans 41, 42, as shown in FIGS. 2 and 7. The sleeve member 70 comprises a container filled with a refrigerant gel, such as a formulation of propylene glycol and water. Alternatively, other refrigerant compositions can be used, such as the refrigerant gel compositions described in U.S. Pat. No. 4,357,809, which is incorporated herein. A planar support member 72 having vent openings 45 formed therein can be positioned intermediate the sleeve 70 and the fans 41, 42, as shown in FIGS. 3, 4 and 6.

In a preferred embodiment, foam insulation 75 covers the canister compartment 20 and the battery bank 60, as shown in FIG. 7. The foam insulation 75 partially covers the tube 30.

In a method of using the apparatus 10 according to an embodiment of the invention, the apparatus 10 can be positioned inside a container, such as a thermally insulated cooler. The apparatus 10 can be used to cool the interior of the cooler. The intake fan 41 of the apparatus 10 draws in warm air from the interior of the cooler, and the outlet fan 42 blows out cooler air thereby cooling the interior of the cooler. The apparatus 10 can keep food and beverage items stored in the cooler cool for long periods of time without the need for ice. The temperature regulating apparatus 10 is not operatively connected to the cooler and is removable from the cooler without removing any part of the cooler. The apparatus 10 does not alter the form, fit or function of the cooler in which it is positioned.

Figure 9:
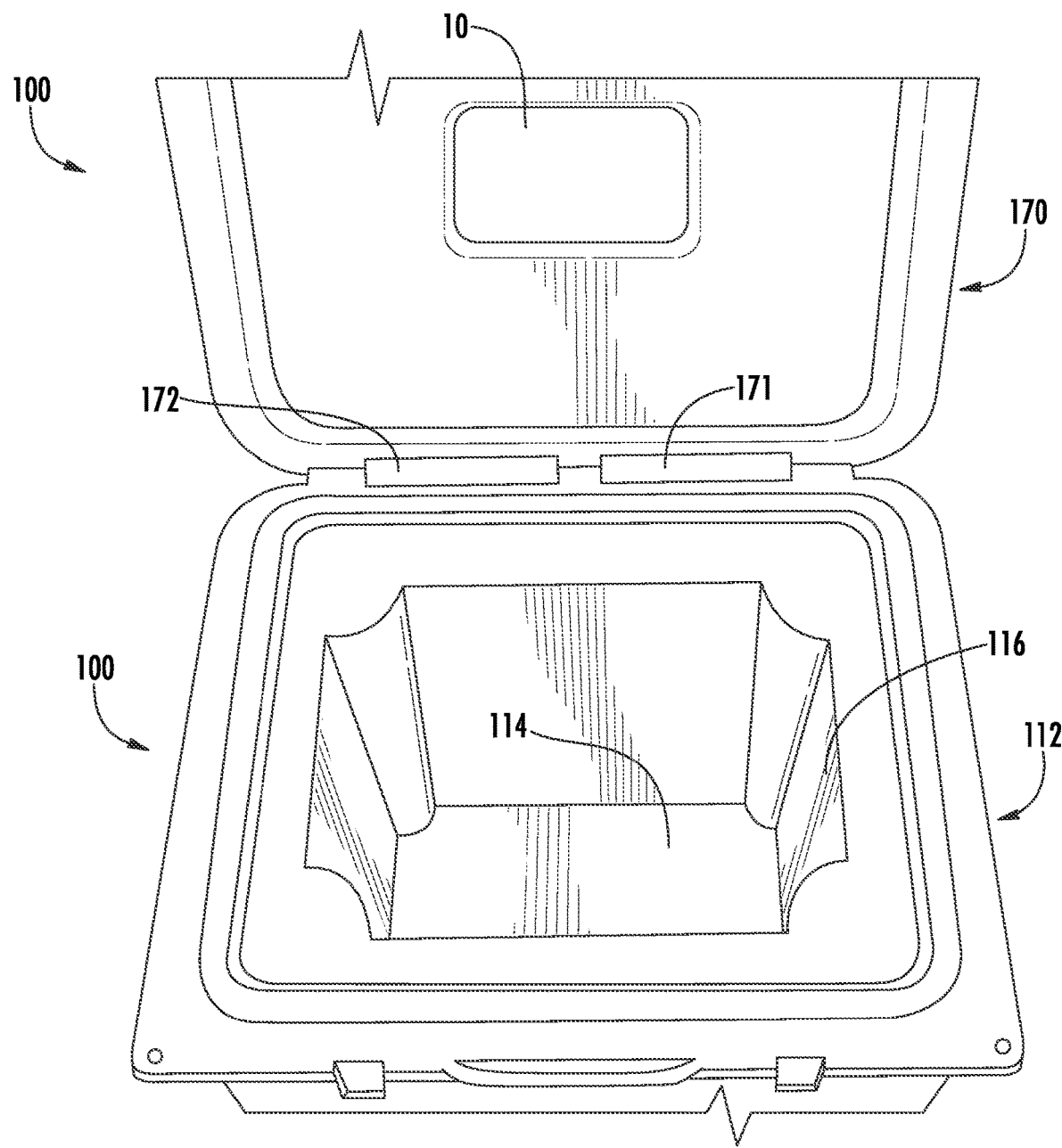
FIG. 9 is a perspective view of a container apparatus according to an embodiment of the invention.
Figure 10:
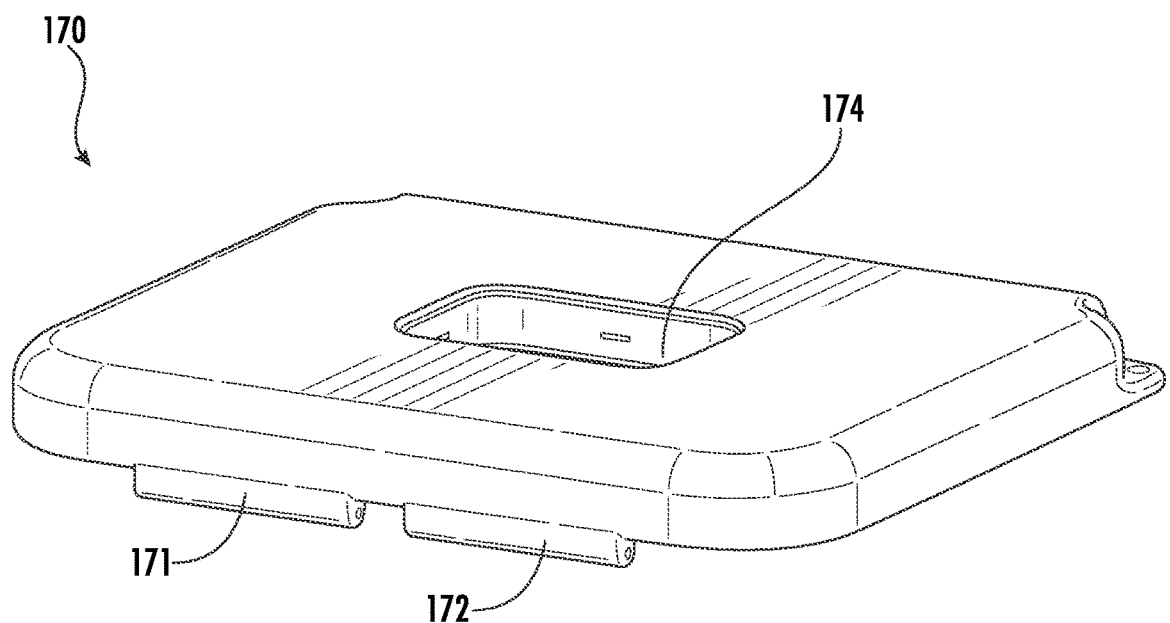
FIG. 10 is a partial perspective view of the apparatus of FIG. 9.

Another embodiment of the invention comprises a container apparatus, shown generally at reference numeral 100 in FIGS. 9 and 10. The container apparatus 100 comprises a container body 112 and the above described temperature regulating apparatus 10 removably positioned within the container body 112. The container body 112 comprises a substantially rectangular base 114, a substantially rectangular sidewall 116 extending upwardly from the base, and a substantially rectangular lid 170 pivotably attached to the upper edge of the sidewall 116 by hinges 171, 172. As shown in FIGS. 9 and 10, an opening 174 is formed in the lid 170, and the temperature regulating apparatus 10 can be releasably retained within the opening 174. The apparatus 10 can regulate the ambient temperature within the interior of the container body 112, and keep items stored in the container body 112 cool. The apparatus 10 is not electrically connected to the container body 112, and can be removed from the container body 112 without removing any other components of the container apparatus 100.

Figure 11:
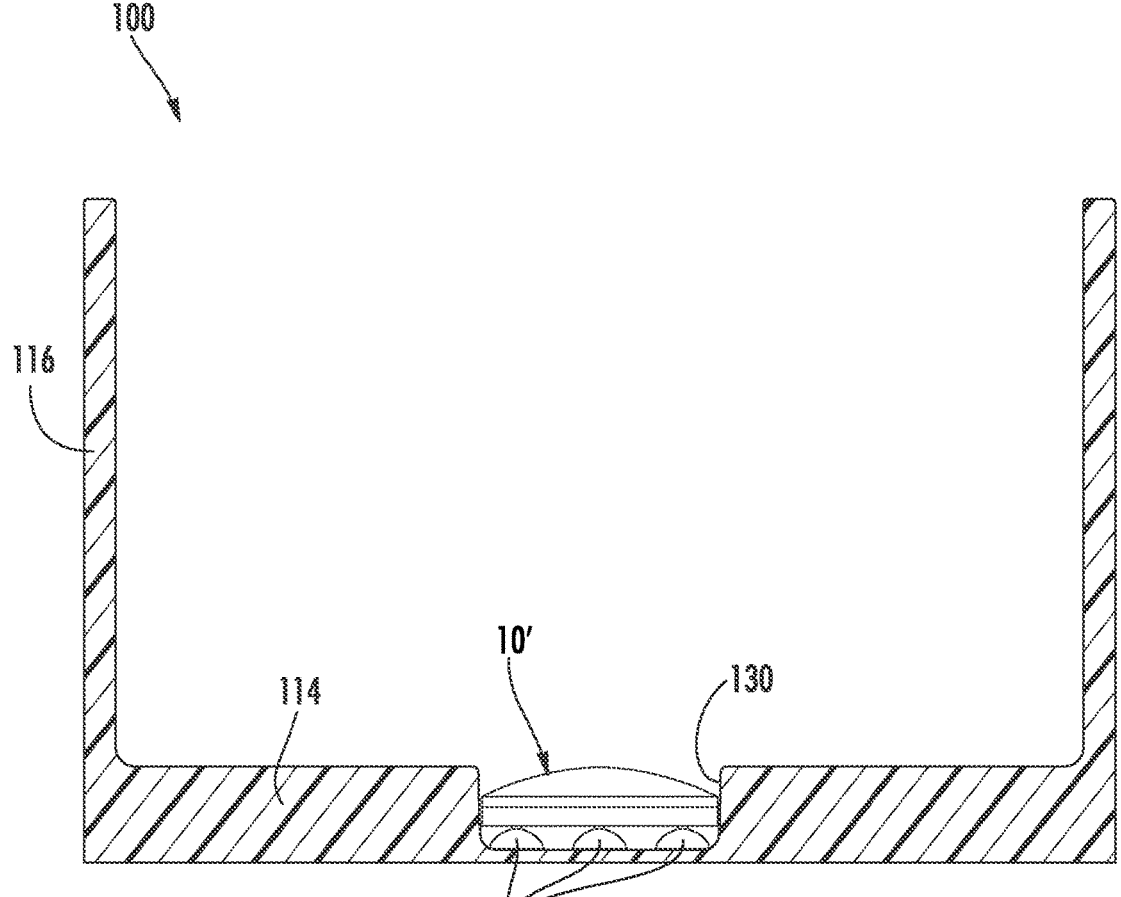
FIG. 11 is a perspective view of a container apparatus according to another embodiment of the invention.
Figure 12:
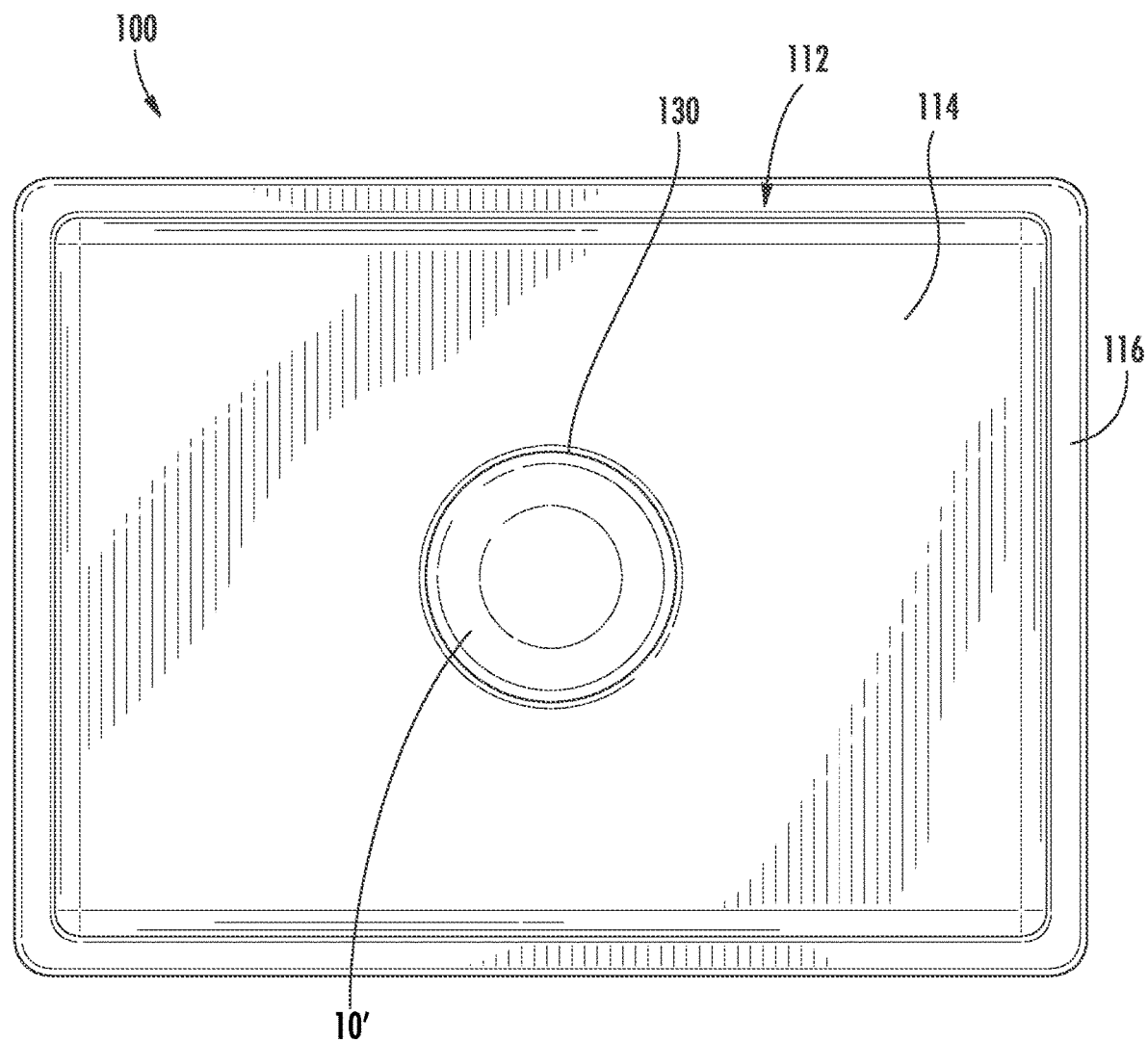
FIG. 12 is a top plan view of the apparatus of FIG. 11.

According to a preferred embodiment, the container apparatus 100 can include a second temperature regulating apparatus 10', which can be positioned within a concave recess 130 formed proximate the center of the base 114, as shown in FIGS. 11 and 12. The temperature regulating apparatus 10' can have a circular shape, and the recess 130 can have a circular shape conforming to the temperature regulating apparatus 10', as shown in FIGS. 11 and 12. A plurality of suction cups 134 can be attached to the underside of the apparatus 10' and the base 114 of the container body 112, as shown in FIG. 11. The suction cups 134 help to retain the apparatus 10' in the recess 130 and prevent the apparatus 10' from coming out of the recess 130.

Figure 13:
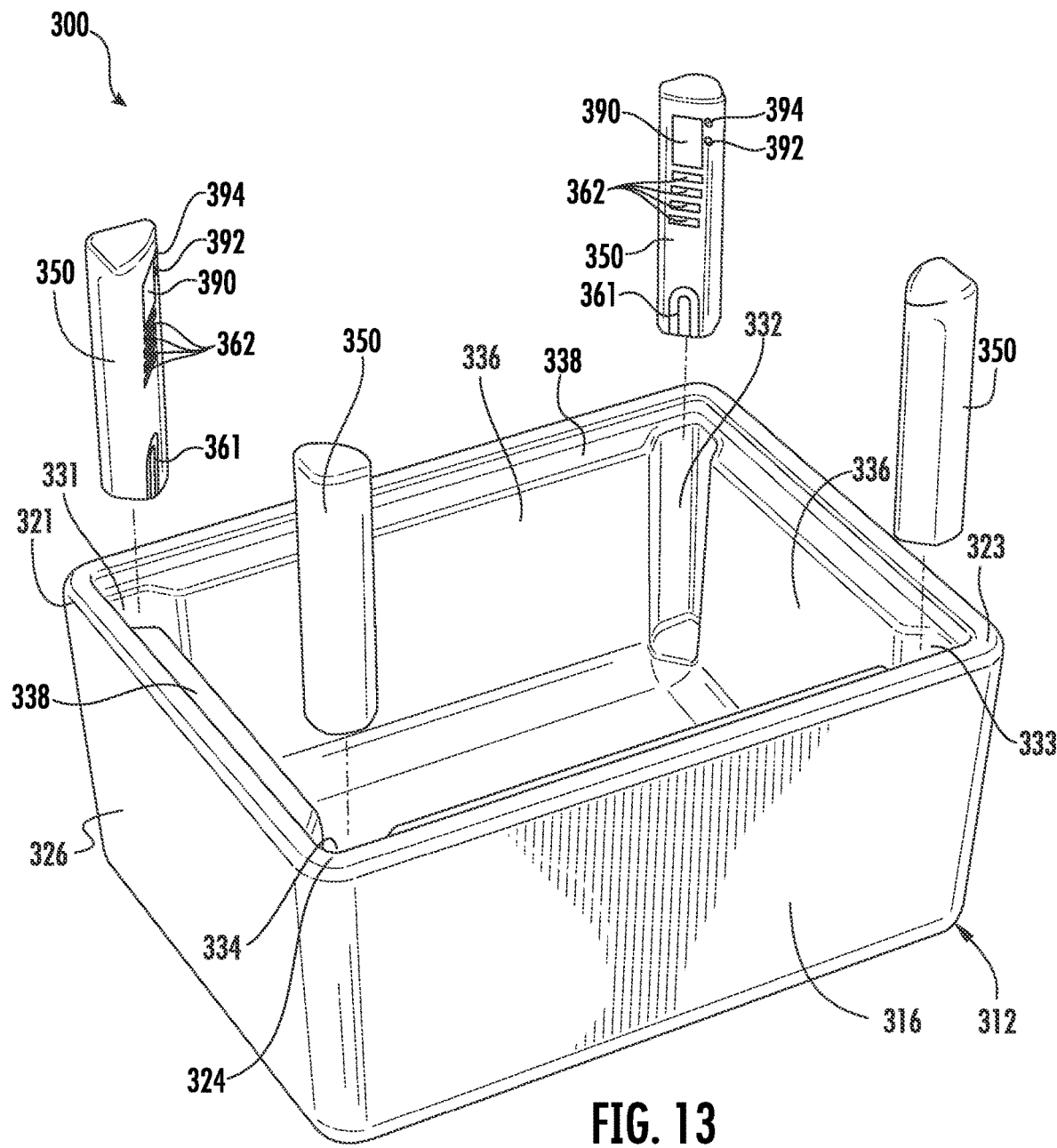
FIG. 13 is a perspective view of a container apparatus according to another embodiment of the invention.
Figure 14:
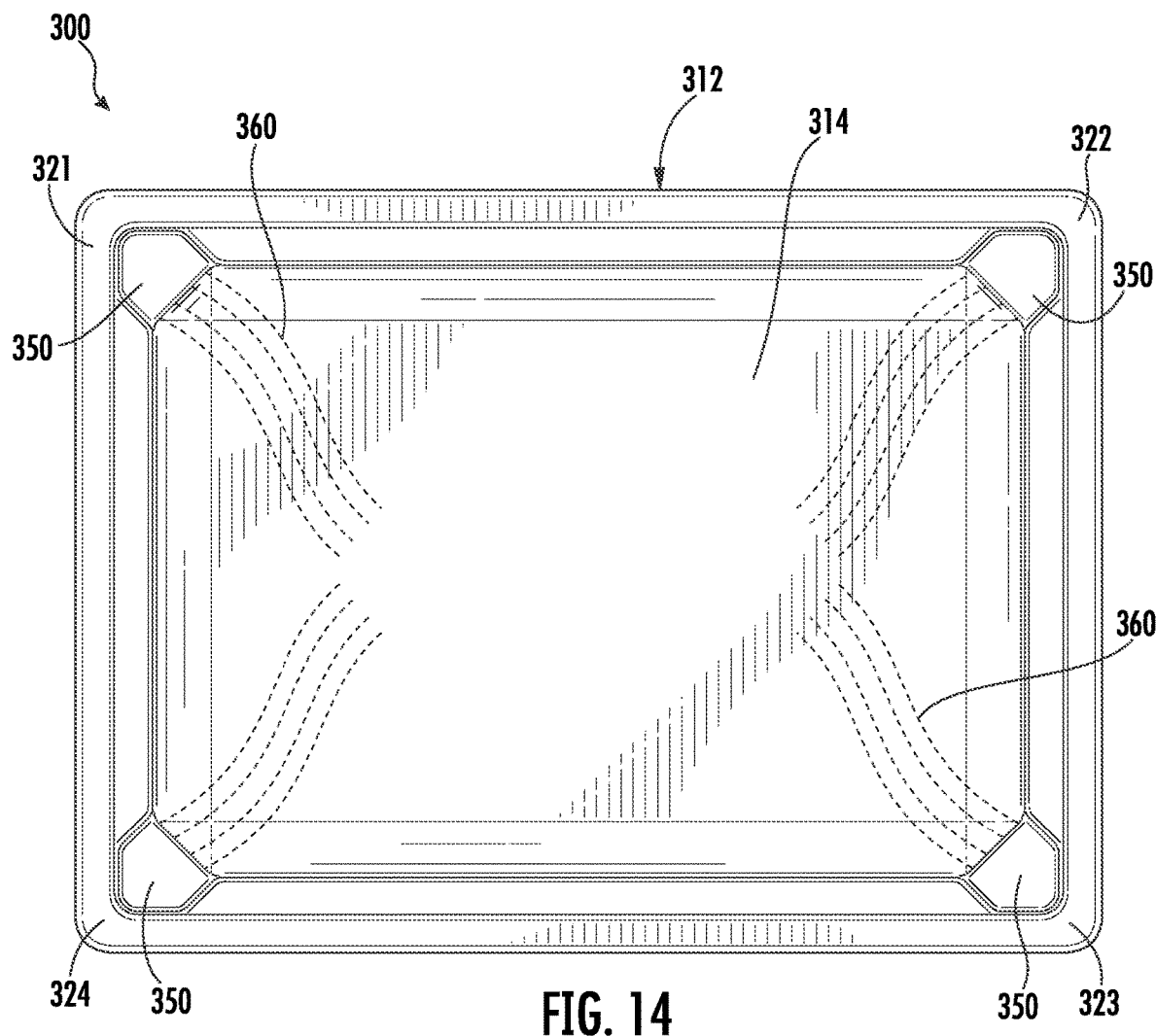
FIG. 14 is a top plan view of the apparatus of FIG. 13.

A container apparatus according to another embodiment of the invention is illustrated in FIGS. 13 and 14, and shown generally at reference numeral 300. The container apparatus 300 includes a plurality of temperature regulating apparatuses 350. Each temperature regulating apparatus 350 has the same functional components of the above described temperature regulating apparatus 10, but the apparatus 350 has an elongate shape, as shown in FIG. 13.

The container apparatus 300 comprises a container body 312 having an interior surface that is adapted for receiving and releasably maintaining each temperature regulating apparatus 350 therein. The container body 312 can be made of plastic or other suitable material. The container 312 can be made by injection molding or other suitable manufacturing process. The container 312 can be a thermally insulated cooler.

The container 312 can have a substantially rectangular base 314, and a substantially rectangular sidewall 316 extending upwardly from the base 314, as shown in FIGS. 13 and 14. The sidewall 316 has four sides defining four corners 321, 322, 323, 324. The sidewall 316 can include an outer wall section 326 and an inner wall section 336, as shown in FIG. 13. The surface of the base 314 and the surface of the inner wall section 336 define interior surfaces of the container 312. The top of the inner wall section can be lower than the top of the outer wall section 326, thereby creating a tiered rest platform 338.

Four substantially concave and elongate recesses 331, 332, 333, 334 can be formed in the inner wall section 336 proximate the four corners of the sidewall 316, as shown in FIGS. 13 and 14. The recesses 331, 332, 333, 334 begin at the top of the inner wall section 336 and extend downwardly to the base 314 of the container 312.

The elongate recesses 331, 332, 333, 334 in the container 312 are sized and shaped to conform to the size and shape of the temperature regulating apparatus 350, such that each recess 331, 332, 333, 334 can receive and retain a temperature regulating apparatus 350 therein, as shown in FIGS. 13 and 14. Preferably, each apparatus 350 has a length approximately equal to the length of the recesses 331, 332, 333, 334, and has a perimeter slightly less than the effective perimeter of the recesses 331, 332, 333, 334, such that the apparatus 350 can be inserted into the recesses 331, 332, 333, 334, as shown in FIGS. 13 and 14, and retained within the recesses 331, 332, 333, 334 by frictional engagement. Each apparatus 350 can be positioned within one of the recesses 331, 332, 333, 334, and when so positioned the apparatus 350 is substantially flush with a non-recessed portion of the interior surface 336 of the container body 312, as shown in FIG. 14.

Each apparatus 350 dispenses cooling gas 360, such as carbon dioxide, into the interior of the container body 312, as shown in FIG. 14. When the thermal probe of the apparatus 350 detects that the temperature within the container body 312 has risen above the desired temperature, the motherboard can send a signal causing the apparatus 350 to dispense another blast of cooling gas 360 into the interior area of the container 312.

Each temperature regulating apparatus 350 can include a touch screen display 390 by which a user can enter data into the motherboard of the apparatus 350. For example, the touch screen display 390 can be used by the user to enter a temperature that the user desires to be maintained within the cooler 300. Alternatively, each apparatus 350 can include keys, buttons or other means for a user to enter data into the motherboard. The user can enter a desired temperature on the touch screen display 390. The microcontroller of the motherboard can be programmed with a non-transitory computer readable storage medium comprising software having programming instructions that, when executed, causes the microcontroller to electronically transmit signals causing the apparatus 350 to dispense cooling gas 360 at timed intervals in order to achieve and maintain the desired temperature that has been entered by the user on the touch screen display 390. Air can be drawn into each apparatus 350 through an intake vent 361. Cooling gas 360 is emitted through vent openings 362 in each apparatus 350.

Each apparatus 350 includes a power source positioned within the housing of the apparatus 350 that can be operatively connected to the motherboard and the intake and outlet fans. The power source can be a 5000 mAh battery bank that can be recharged via a USB charge port 392. Each apparatus 350 can include an on/off button 394.

The temperature regulating apparatus 350 is not operatively connected to the container body 312. That is, the apparatus 350 is not electrically connected to the container body 312 and can function independently from the container body 312. As such, each apparatus 350 can be easily removed from the container body 312 when desired. For example, each apparatus 350 can be removed from the container body 312 for recharging, repair or replacement of the apparatus 350. Each apparatus 350 can be easily slid in and out of its respective recess 331, 332, 333, 334.

According to an embodiment of the invention, the container apparatus 300 can include a light assembly. For example, a light assembly such as the rectangular light assembly shown at reference numeral 355 in FIGS. 20 and 21 of U.S. Pat. No. 10,088,147, which is incorporated herein, can be positioned on the rest platform 338 of the container apparatus 300.

Figure 15:
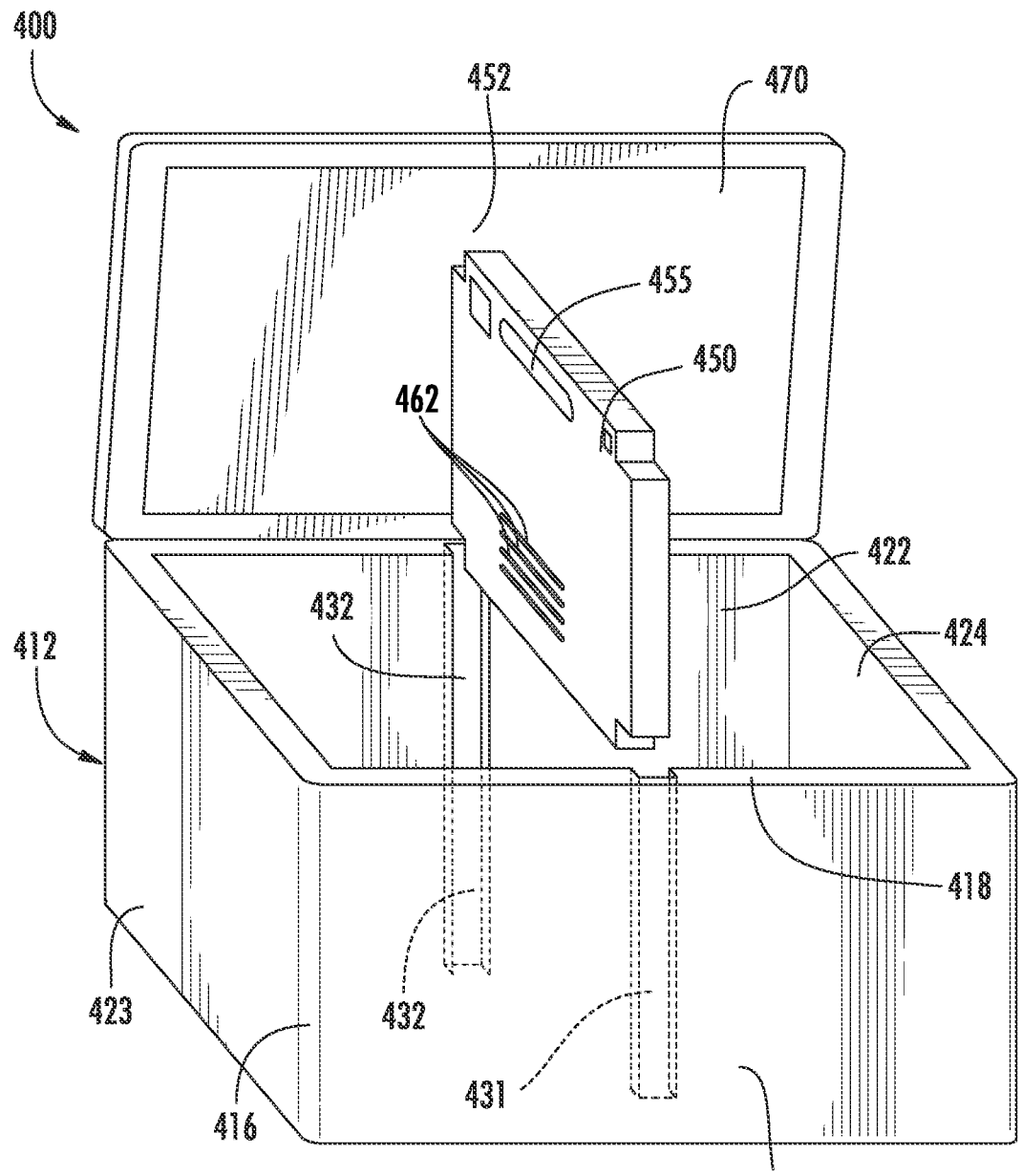
FIG. 15 is a perspective view of a container apparatus according to another embodiment of the invention.
Figure 16:
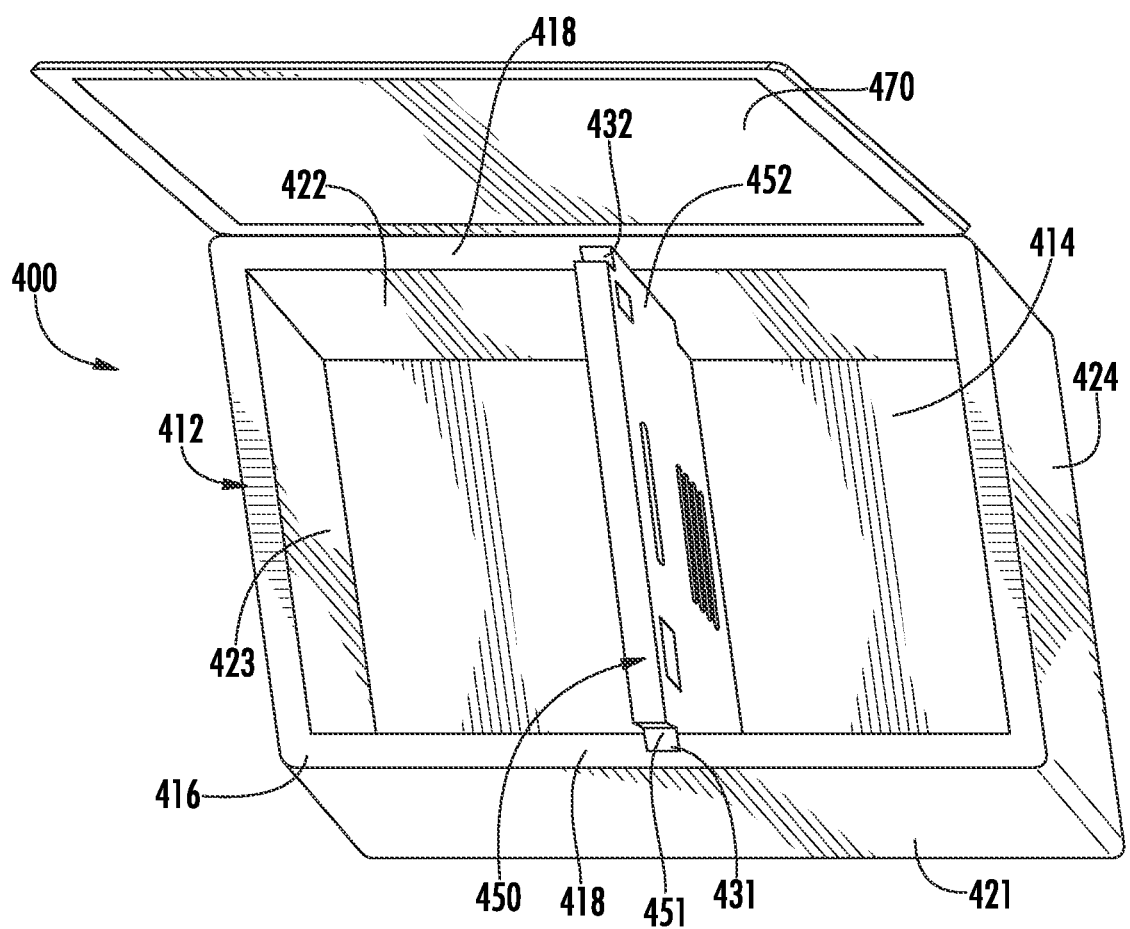
FIG. 16 is another perspective view of the apparatus of FIG. 15.

A temperature regulating apparatus according to another embodiment of the invention is illustrated in FIGS. 15 and 16, and shown generally at reference numeral 450. The temperature regulating apparatus 450 has the same functional components of the above described apparatus 10, but has a slender panel-like housing 452, as shown in FIG. 15. The temperature regulating apparatus 450 can be used in a container, such as a container apparatus described in U.S. Pat. No. 10,088,147, which is incorporated herein by reference.

A temperature regulated container apparatus according to a preferred embodiment of the invention is illustrated in FIGS. 15 and 16, and shown generally at reference numeral 400. The container apparatus 400 comprises a container body 412, and the temperature regulating apparatus 450. A lid 470 can be pivotally connected to the upper edge 418 of the container body 412. The container body 412 and the lid 470 can be made of plastic or other suitable material, and can be made by injection molding or other suitable manufacturing process. The temperature regulating apparatus 450 is releasably retained within the container body 412.

The container body 412 can comprise a substantially rectangular base 414 for positioning substantially horizontally on a floor surface, and a substantially rectangular sidewall 416 extending substantially vertically from the base 414. The sidewall 416 has four sides 421, 422, 423, 424. Two substantially concave and elongate recesses 431, 432 are formed in the interior surface on opposing sides 401, 402 of the sidewall 416, as shown in FIG. 15. The recesses 431, 432 define channels beginning at the upper edge 418 of the sidewall 416 and extending downwardly to the base 414 of the container 412, as shown in FIG. 15. The channels 431, 432 extend substantially vertically, and are substantially perpendicular to the container base 414.

As shown in FIGS. 15 and 16, the temperature regulating apparatus 450 can be slid into the opposed recessed channels 431, 432. The apparatus 450 emits cooling gas, such as carbon dioxide, through vent openings 445 into the interior of the cooler 400. The temperature regulating apparatus 450 is not electrically connected to the cooler 400, and can be easily removed from the cooler 400 when desired by sliding the apparatus 450 up out of the recessed channels 431, 432. An opening 455 can be formed in the apparatus 450 to serve as a handle for the user.

Temperature regulating apparatuses and methods of using same are described above. Various changes can be made to the invention without departing from its scope. The above description of embodiments of the invention are provided for the purpose of illustration only and not limitation—the invention being defined by the claims and equivalents thereof.

What is claimed is:
1. A temperature regulating apparatus comprising:
(a) a housing comprising at least one wall having a first vent and a second vent formed therein;
(b) an intake fan positioned within the housing proximate the first vent, the intake fan adapted to draw in air from outside of the housing through the first vent and into the housing;
(c) an outlet fan positioned within the housing proximate the second vent, the outlet fan adapted to blow air in the housing through the second vent to exit the housing; and
(d) at least one container positioned within the housing containing pressurized gas capable of altering an ambient temperature, wherein pressurized gas released from the at least one container is blown by the outlet fan through the second vent out of the housing whereby an ambient temperature outside of the housing is altered.

2. The apparatus according to claim 1, wherein the pressurized gas comprises at least one from the group consisting of carbon dioxide, freon, nitrogen, difluoroethane, trifluoroethane, and tetrafluoroethane.

3. The apparatus according to claim 1, wherein the pressurized gas lowers the ambient temperature.

4. The apparatus according to claim 1, further comprising a thermal reed switch connected to the at least one container adapted for controlling the flow of pressurized gas from the at least one container, the thermal reed switch moveable between an open position wherein pressurized gas is allowed to exit the at least one container and a closed position wherein pressurized gas does not exit the at least one container.

5. The apparatus according to claim 4, further comprising a temperature sensing device positioned within the housing and a computing device operatively connected to the temperature sensing device and the thermal reed switch, the computing device adapted to send a signal to the thermal reed switch causing the thermal reed switch to move to the open position allowing pressurized gas to flow from the at least one container when the temperature sensing device detects an ambient temperature above a predetermined temperature.

6. The apparatus according to claim 5, wherein the computing device comprises a non-transitory computer readable storage medium comprising software having programming instructions that, when executed, causes the computing device to electronically transmit the signal to the thermal reed switch causing the thermal reed switch to move to the open position allowing pressurized gas to flow from the at least one container when the temperature sensing device detects an ambient temperature above the predetermined temperature.

7. The apparatus according to claim 5, wherein the computing device comprises a timer, and the computing device sends a signal to the thermal reed switch causing the thermal reed switch to move to the open position allowing pressurized gas to flow from the at least one container at timed intervals to maintain ambient temperature at the predetermined temperature.

8. The apparatus according to claim 5, further comprising a motherboard comprising the computing device and a touch screen display operatively connected to the computing device, wherein a user can enter the predetermined temperature via the touch screen display.

9. The apparatus according to claim 5, wherein the computing device comprises a microcontroller operatively connected via wireless communication technology to a second computing device located outside of the housing whereby a user can enter the predetermined temperature via the second computing device.

10. The apparatus according to claim 9, wherein the second computing device comprises a mobile smartphone.

11. The apparatus according to claim 1, further comprising a tube having a first end in communication with the at least one container and a second end opposed to the first end, wherein pressurized gas released from the at least one container travels through the tube and exits the second end of the tube into an interior area of the housing and is blown by the outlet fan through the second vent out of the housing.

12. The apparatus according to claim 11, further comprising a sleeve member containing a refrigerant gel, the sleeve member positioned intermediate the second end of the tube and the outlet fan.

13. The apparatus according to claim 11, further comprising a thermal reed switch operatively connected to the tube and adapted for controlling the exit of pressurized gas from the tube, the thermal reed switch moveable between an open position wherein pressurized gas is allowed to exit the second end of the tube and a closed position wherein pressurized gas does not exit the tube.

14. The apparatus according to claim 13, further comprising a temperature sensing device positioned within the housing and a computing device operatively connected to the temperature sensing device and the thermal reed switch, the computing device adapted to send a signal to the thermal reed switch causing the thermal reed switch to move to the open position allowing pressurized gas to exit the second end of the tube when the temperature sensing device detects an ambient temperature above a predetermined temperature.

15. The apparatus according to claim 14, wherein the computing device comprises a non-transitory computer readable storage medium comprising software having programming instructions that, when executed, causes the computing device to electronically transmit the signal to the thermal reed switch causing the thermal reed switch to move to the open position allowing pressurized gas to flow from the second end of the tube when the temperature sensing device detects an ambient temperature above the predetermined temperature.

16. The apparatus according to claim 14, wherein the computing device comprises a timer, and the computing device sends a signal to the thermal reed switch causing the thermal reed switch to move to the open position allowing pressurized gas to flow from the second end of the tube at timed intervals to maintain ambient temperature at the predetermined temperature.

17. The apparatus according to claim 14, further comprising a motherboard comprising the computing device and a touch screen display operatively connected to the computing device, wherein a user can enter the predetermined temperature via the touch screen display.

18. A container apparatus comprising:
(a) an enclosure defining an interior area for storing items therein, the enclosure having an interior surface facing the interior area and a recess formed in the interior surface to form a recessed portion of the interior surface; and
(b) a temperature regulating device comprising:
(i) a housing comprising at least one wall having a first vent and a second vent formed therein, the housing positioned within the recessed portion of the interior surface of the enclosure with the first vent and the second vent facing the interior area of the enclosure,
(ii) an intake fan positioned within the housing proximate the first vent, the intake fan adapted to draw in air from outside of the housing through the first vent and into the housing,
(iii) an outlet fan positioned within the housing proximate the second vent, the outlet fan adapted to blow air in the housing through the second vent to exit the housing and enter the interior area of the enclosure, and
(iv) at least one container positioned within the housing containing pressurized gas capable of altering an ambient temperature, wherein pressurized gas released from the at least one container is blown by the outlet fan through the second vent out of the housing and into the interior area of the enclosure whereby an ambient temperature of the interior area of the enclosure is altered.

19. The apparatus according to claim 18, wherein the recess is sized and shaped to receive the housing of the temperature regulating device therein and the housing is substantially flush with a non-recessed portion of the interior surface when positioned in the recess.

20. The apparatus according to claim 18, wherein the enclosure comprises a thermally insulated cooler, and the temperature regulating device is not electrically connected to the enclosure.

* * * * *